United States Patent [19]
Gish

[11] Patent Number: 5,724,554
[45] Date of Patent: Mar. 3, 1998

[54] APPARATUS FOR DUAL SERIAL AND PARALLEL PORT CONNECTIONS FOR COMPUTER PERIPHERALS USING A SINGLE CONNECTOR

[75] Inventor: Steven Gish, Shingle Springs, Calif.

[73] Assignee: Intel Corporation, Santa Clara, Calif.

[21] Appl. No.: 347,268

[22] Filed: Nov. 30, 1994

[51] Int. Cl.$^6$ ............... G06F 3/00; G06F 3/023
[52] U.S. Cl. ............... 395/500; 395/891; 395/893; 395/831; 395/834; 361/728; 361/775
[58] Field of Search ............... 395/500, 891, 395/375, 280, 281, 282, 283, 284, 834, 831; 307/112; 364/DIG. 1, 489, 512; 439/43, 46, 119; 400/76, 719; 361/728, 772, 775, 791, 807, 809

[56] References Cited

U.S. PATENT DOCUMENTS

| | | | |
|---|---|---|---|
| 4,672,535 | 6/1987 | Katzman et al. | 395/858 |
| 5,067,076 | 11/1991 | Hautsch et al. | 395/275 |
| 5,090,830 | 2/1992 | Kroeger et al. | 400/719 |
| 5,134,706 | 7/1992 | Cushing et al. | 395/725 |
| 5,265,238 | 11/1993 | Canova, Jr. et al. | 395/500 |
| 5,280,251 | 1/1994 | Stangio | 324/539 |
| 5,313,595 | 5/1994 | Lewis et al. | 395/325 |
| 5,319,754 | 6/1994 | Meinecke et al. | 395/325 |
| 5,335,338 | 8/1994 | Proesel | 395/500 |
| 5,336,951 | 8/1994 | Josephson et al. | 307/465 |
| 5,390,321 | 2/1995 | Proesel | 395/500 |
| 5,426,738 | 6/1995 | Hsieh et al. | 395/275 |
| 5,438,678 | 8/1995 | Smith | 395/750 |
| 5,471,585 | 11/1995 | Barakat et al. | 395/308 |
| 5,535,371 | 7/1996 | Stewart et al. | 395/500 |

*Primary Examiner*—Kevin J. Teska
*Assistant Examiner*—Thai Phan
*Attorney, Agent, or Firm*—Owen L. Lamb

[57] ABSTRACT

A 25-pin cable socket has serial pins and parallel pins. Pins 18 through 25 are at ground level only if a parallel cable is inserted in the socket. Serial communication lines are provided to a serial controller and parallel communication lines are provided to a parallel controller. A OR is connected to the pins 18 through 25. A switch is connected to the output of the OR. If ground is sensed at the pins 18 through 25, the OR output is asserted causing the switch to be activated to connect the parallel pins associated with parallel operation to the parallel communication lines. If ground is not sensed at the pins 18 through 25 the switch is deactivated to connect the serial pins associated with serial operation to the serial communication lines.

14 Claims, 2 Drawing Sheets

APPARATUS FOR DUAL SERIAL AND PARALLEL PORT CONNECTIONS FOR COMPUTER PERIPHERALS USING A SINGLE CONNECTOR

BACKGROUND OF THE INVENTION

1. Field of the Invention

The present invention is related to personal computers and more particularly to an apparatus that provides both serial and parallel port connectivity utilizing a single connector to desk top modems and other computer peripherals.

2. Background Art

In personal computers, there are serial input/output (I/O) ports and parallel I/O ports that are provided for communication with peripheral devices. A serial (I/O) port sends and receives one data bit at a time in serial format over a single data line in a single cable. A serial port is used primarily for modems, serial printers, plotters and mice. A parallel input/output (I/O) port sends and receives eight data bits in parallel format over eight lines in a single cable simultaneously. A parallel port is used primarily for parallel printers.

In the past, external modems have been connected to a host computer, such as an IBM compatible personal computer, by an EIA standard RS-232 serial interface. The EIA standard RS-232 serial interface is a set of signal characteristics (protocols) specified by the Electronics Industries Association (EIA) for the asynchronous transmission of computer data. This interface provides a standard serial connector and cable between the host computer and a peripheral modem (modulator/demodulator). A modem is a device that converts computer signals at a communications port to modulated signals compatible with a telephone line and transforms signal received back over the telephone line to digital signals compatible with computer electronics. The protocols associated with a serial interface limit the total volume of work performed by a computing system over a period of time, called throughput. With the advent of higher speed 28.8k baud modems the necessity of improved host/modem interfacing has lead some modem manufacturers to provide a separate parallel port connector plug on their external modem products. This is done to realize the full data throughput that can be achieved when using 28.8k baud modems. The addition of this parallel interface to physically small modems requires the utilization of miniaturized connectors due to the lack of space on the modem panel surface.

A miniature standard connector has been developed that uses a DB25 connector and ribbon cable connected to either a serial port or a parallel port. A female DB25 socket is used for serial devices and receives only a male connector on a ribbon cable. A male DB25 socket is used for parallel devices and receives only a female connector on a ribbon cable. A male connector has a number pins and a female connector has a like number receptacles that receive a like number and orientation of male pins when the connectors are joined together. Thus, two separate sockets are needed on the back panel, one male and one female. DB25 connectors are standard for both serial and parallel interfaces with only the gender (male or female) of the connector being specific to each protocol.

It is desirable to provide both serial and parallel functionality into a single connector on a peripheral device, such as a modem, to eliminate the need for two sockets on the device back panel.

SUMMARY OF THE INVENTION

The present invention is used with a multi-pin cable socket having first pins being at ground level only upon a condition that a parallel cable is inserted in the socket, second pins associated with serial operation and third pins associated with parallel operation. A logic circuit is connected to the first pins. A switch connected to the serial communication lines, the parallel communication lines and to the logic circuit connects the second pins to serial communication lines upon a condition that the first pins are not at ground level and connects the third pins to parallel communication lines upon a condition that the first pins are at ground level.

This allows a user to connect a modem or computer peripheral to either the parallel or serial port by using a simple off the shelf cable gender changer. A gender changer is a coupling unit that permits two connectors of the same gender (male connectors or two female connectors) to be joined together.

This invention provides both serial and parallel port connectivity utilizing a single DB25 connector to modems and other computer peripherals. This is accomplished by building both serial and parallel functionality into a single connector which automatically senses what kind of port is associated with a cable that is plugged into a connector and sets itself to the appropriate communication mode. DB25 connectors are standard for both serial and parallel interfaces with only the gender of the connector being specific to each protocol. This allows a user to connect a modem or computer peripheral to either the parallel or serial port of a computer by plugging the cable into a simple off the shelf cable gender changer. The end result is a modem which takes advantage for the performance benefits of a parallel interface while maintaining conventional serial connectivity, all without sacrificing any additional panel surface area.

An advantage of this invention is that it maximizes performance, results in minimum connector count and provides product differentiation.

A further advantage of this invention is that it results in a modem which takes advantage of the performance benefits of a parallel interface while maintaining conventional serial connectivity, all without sacrificing any additional modem panel surface area.

A further advantage of this invention is that it eliminates the need for additional or custom connectors.

The foregoing and other features and advantages of the invention will be apparent from the following more particular description of a preferred embodiment of the invention as illustrated in the accompanying drawings.

DESCRIPTION OF THE PREFERRED EMBODIMENT

Figure 1:
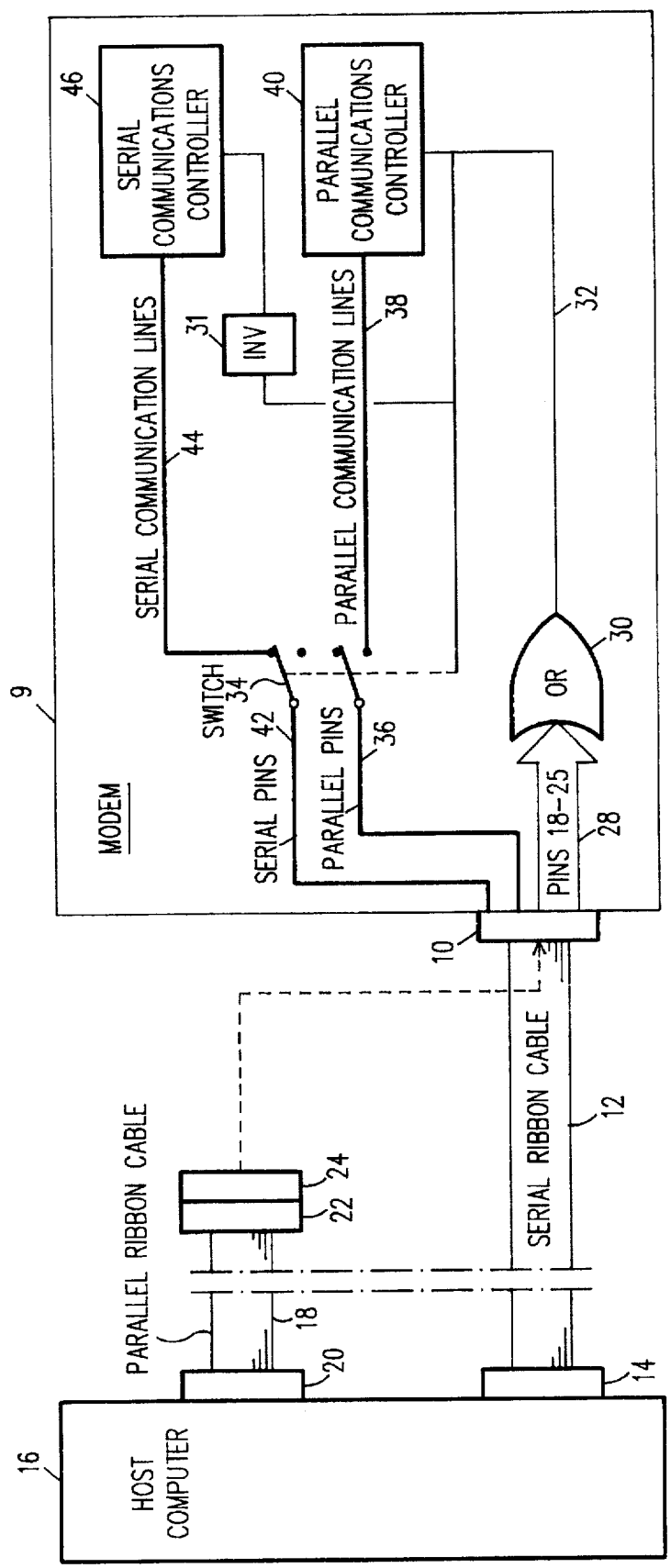
FIG. 1 is a block diagram of a computer system in which the present invention is embodied; and, FIG. 2 is flow diagram of a method of sensing serial and parallel modes of operation.

Refer to FIG. 1 which is a block diagram of a computer system in which the present invention is embodied. A single female socket (10) is provided on the back panel of a peripheral device, such as a modem (9). A ribbon cable (12) from a serial port (14) on a host computer (16) has a connector on the end of it that has male pins that engage directly with the female socket (10) on the back panel.

A ribbon cable (18) from a parallel port (20) on the host computer (16) has a parallel port connector plug (22) on the end of it that has female pins that will not engage directly with the female socket (10) on the back panel. A gender changer (24) plugged into this parallel port connector plug converts it to male pins that will engage with the female socket (10) on the back panel.

The serial port 25-pin serial port connector pin assignment is shown in Table I. If a serial communications cable (12) is plugged into the socket (10), then the DB25 pins 18-25 are not connected to ground. The 8 pins (28) connected to OR (30) in this case are pulled up causing the output (32) of the OR (30) to remain at a logic one. This causes the switch (34) to be switched to the serial position placing the DB25 serial communications port pin out (42) to be connected to the serial communication lines (44). The control line (32) activates the serial communications controller (46) and deactivates the parallel communications controller (40).

TABLE I

| DB25 Pin # | Signal | Definition |
|---|---|---|
| — | Key | pin missing |
| 2 | TXD | transmit data |
| 3 | RXD | send data |
| 4 | RTS | request to send |
| 5 | CTS | clear to send |
| 6 | DSR | data set ready |
| 7 | Ground | Ground |
| 20 | DTR | data terminal ready |
| — | DCD | data carrier detect |
| 22 | RI | ring indicator |
| 25 | MGTEST | mfg. test |

The parallel port connector pin assignment is shown in Table II. If a parallel port cable is plugged into the socket, then the DB25 pins 18-25 are connected to ground. These 8 pins (28) are connected to an OR (30) such that the inputs to the OR are pulled down causing the output (32) of the OR to be pulled down. This causes a switch (34) to be switched to the parallel position placing the DB25 parallel port pins out (36) to be connected to the parallel communication lines (38). The control line (32) activates the appropriate controller electronics, in this case the parallel communications controller (40).

TABLE II

| DB25 Pin # | Signal | Definition |
|---|---|---|
| 1 | STROBE* | Strobe* |
| 2 | PRTD0 | Printer data bit 0 |
| 3 | PRTD1 | Printer data bit 1 |
| 4 | PRTD2 | Printer data bit 2 |
| 5 | PRTD3 | Printer data bit 3 |
| 6 | PRTD4 | Printer data bit 4 |
| 7 | PRTD5 | Printer data bit 5 |
| 8 | PRTD6 | Printer data bit 6 |
| 9 | PRTD7 | Printer data bit 7 |
| 10 | ACK* | Acknowledge |
| 11 | BUSY | Busy |
| 12 | PE | Paper end |
| 13 | SLCT | select |
| 14 | AUTOFDXT* | auto feed |
| 15 | ERROR* | Error |
| 16 | INIT* | initializing printer |
| 17 | SLCTIn | select input |
| 18-25 | Ground | Ground |
| — | Chassis ground | Chassis ground |
| — | Key (pin missing) | Key (pin missing) |
| — | no connection | no connection |

Figure 2:
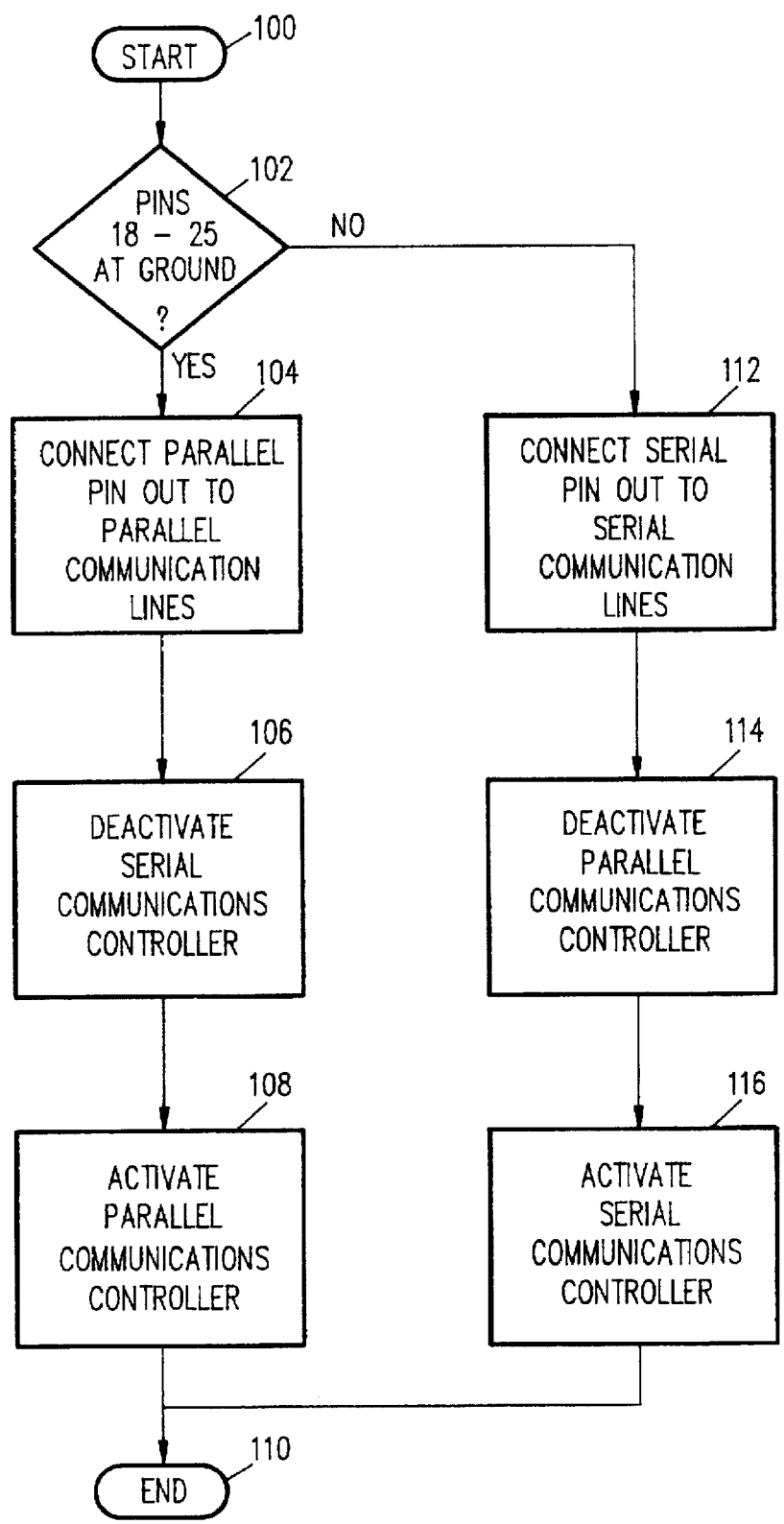

Refer to FIG. 2 which is flow diagram of a method of sensing serial and parallel modes of operation. The flow starts (100) and checks pins 18-25 for ground (102). If at ground level, the YES path is taken and the parallel pin out is connected to the parallel communication lines (104). Next, the serial communications controller is deactivated (106). Then, the parallel communications is activated (108), and the flow ends (110).

If at decision block (102) pins 18-25 are not at ground level, the NO path is taken and the serial pin out is connected to the serial communication lines (112). Next, the parallel communications controller is deactivated (114). Then, the serial communications controller is activated (116), and the flow ends (110).

While the invention has been particularly shown and described with reference to preferred embodiments thereof, it will be understood by those skilled in the art that the foregoing and other changes in form and detail may be made therein without departing from the scope of the invention.

What is claimed is:

1. For use with a multi-pin cable socket having first pins, second pins and third pins, said first pins being at ground only upon a condition that a parallel cable is inserted in said socket, said second pins being associated with serial operation and said third pins being associated with parallel operation, an apparatus comprising:

serial communication lines;

parallel communication lines;

logic means connected to said first pins;

switch means connected to said second pins, said third pins, said serial communication lines, said parallel communication lines and to said logic means for connecting said second pins to said serial communication lines upon a condition that said first pins are not at ground and for connecting said third pins to said parallel communication lines upon a condition that said first pins are at ground.

2. For use with a multi-pin cable socket having first pins second pins, and third pins, said first pins being at ground only upon a condition that a parallel cable is inserted in said socket, an apparatus comprising:

serial communication lines;

parallel communication lines;

an OR connected to said first pins;

said OR having an output that is at a first level upon a condition that said first pins are at not ground and at a second level upon a condition that said first pins are at ground; and, a switch connected to said second pins, to said third pins, to said serial communication lines, and to said parallel communication lines;

said switch having a first position and a second position;

said switch being connected to said output of said OR;

said second pins associated with serial operation being connected to said serial communication lines upon a first condition that said switch is in said first position;

said third pins being connected to said parallel communication lines upon a second condition that said switch is in said second position;

said switch being switched to said first position in response to said output of said OR being at said first level and said second position in response to said output of said OR being at said second level.

3. For use with parallel communication lines connected to a parallel communications controller, serial communication lines connected to a serial communications controller, and a multi-pin cable socket having first pins, second pins, and third pins, said first pins being connected to ground only upon a condition that a parallel cable is inserted in said socket for parallel operation, a method comprising steps of:

A. detecting ground at said first pins;

B. connecting said second pins to said parallel communication lines upon a condition that said first pins are detected at ground;

C. deactivating said serial communications controller upon a condition that said first pins are detected at ground; and, D. activating said parallel communications controller upon a condition that said first pins are detected at ground.

4. The method in accordance with claim 3 comprising the additional steps of:

E. connecting said third pins to serial communication lines upon a condition that said first pins are detected not at ground;

F. deactivating said parallel communications controller upon a condition that said first pins are detected not at ground; and, G. activating said serial communications controller upon a condition that said first pins are detected not at ground.

5. For use with a multi-pin cable socket having first pins, second pins and third pins, said first pins being connected to ground only upon a condition that a parallel cable is inserted in said socket for parallel operation, said second pins being associated with serial operation and said third pins being associated with parallel operation, an apparatus comprising:

parallel communication lines;

means for checking said first pins for ground;

means for connecting said third pins to said parallel communication lines upon a condition that said first pins are at ground;

a serial communications controller;

means for deactivating said serial communications controller upon a condition that said first pins are at ground;

a parallel communications controller; and, means for activating said parallel communications controller upon a condition that said first pins are at ground.

6. The apparatus in accordance with claim 5 further comprising:

serial communication lines;

means for connecting said second pins to said serial communication lines upon a condition that said first pins are not at ground;

means for deactivating said parallel communications controller upon a condition that said first pins are not at ground; and, means for activating said serial communications controller upon a condition that said first pins are not at ground.

7. An apparatus comprising:

a cable socket;

said cable socket having first pins, second pins and third pins;

first communication lines;

second communication lines;

logic means connected to said first pins for detecting ground not at said first pins or ground at said first pins;

switch means connected to said cable socket, to said first communication lines, to said second communication lines and to said logic means;

said switch means connecting said second pins to said first communication lines upon said logic means detecting ground not at said first pins;

said switch means connecting said third pins to said second communication lines upon said logic means detecting ground at said first pins.

8. An apparatus comprising:

a cable socket;

said cable socket having first pins, second pins and third pins;

first communication lines;

second communication lines;

an OR connected to said first pins;

said OR having an output that is activated upon a condition that said first pins are at ground; and, a switch connected to said second pins, to said third pins, to said first communication lines, and to said second communication lines;

said switch having a first position and a second position;

said switch being connected to said output of said OR;

said second pins being connected to said first communication lines upon a first condition that said switch is in said first position;

said third pins being connected to said second communication lines upon a second condition that said switch is in said second position;

said switch being switched to said first position upon a condition that said output is activated and to said second position upon a condition that said output is not activated.

9. A method comprising steps of:

A. detecting ground ground at first pins of a cable socket;

B. connecting second pins of said cable socket to first communication lines upon said detecting ground at said first pins;

C. deactivating a second communications controller associated with said second communication lines upon said detecting ground at said first pins; and, D. activating a first communications controller associated with said first communication lines upon said detecting ground at said first pins.

10. The method in accordance with claim 9 comprising additional steps of:

E. detecting not ground at said first pins of said cable socket;

F. connecting third pins of said cable socket to said second communication lines upon said detecting not ground at said first pins;

G. deactivating said first communications controller upon said detecting not ground at said first pins; and, H. activating said second communications controller upon said detecting not ground at said first pins.

11. An apparatus comprising:

a female socket that includes serial pins and parallel pins;

a serial port cable;

said serial port cable having a serial port connector, said serial port connector having male pins that can engage directly with said female socket;

a parallel port cable;

said parallel port cable having a parallel port connector, said parallel port connector having female pins that cannot engage directly with said female socket;

a gender changer plugged into said parallel port connector, said gender changer converting said parallel port connector to male pins that can engage directly with said female socket;

serial communication lines;

parallel communication lines;

an OR having an output control line;

said OR being connected to a number of pins of said female socket; and, a switch connected to said control line, to said serial lines, to said parallel lines, to said serial communication lines and to said parallel communication lines;

said switch having a serial position that causes said serial pins to be connected to said serial communication lines and a parallel position that causes said parallel pins to be connected to said parallel communication lines;

said switch being switched to said serial position or to said parallel depending upon a state of said output control line.

12. The apparatus of claim 11 further comprising:

a serial communications controller connected to said serial communication lines and to said output control line;

a parallel communications controller connected to said parallel communication lines and to said output control line;

said control line activating said parallel communications controller or said serial communications controller depending upon said state of said output control line.

13. The apparatus of claim 11 wherein:

said number of pins are connected to ground upon a condition that said parallel port cable is plugged into said socket; and, said number of pins are not connected to ground upon a condition that said serial port cable is plugged into said socket.

14. The apparatus of claim 12 wherein:

said number of pins are connected to ground upon a condition that said parallel port cable is plugged into said socket; and, said number of pins are not connected to ground upon a condition that said serial port cable is plugged into said socket.

* * * * *